UNITED STATES PATENT OFFICE.

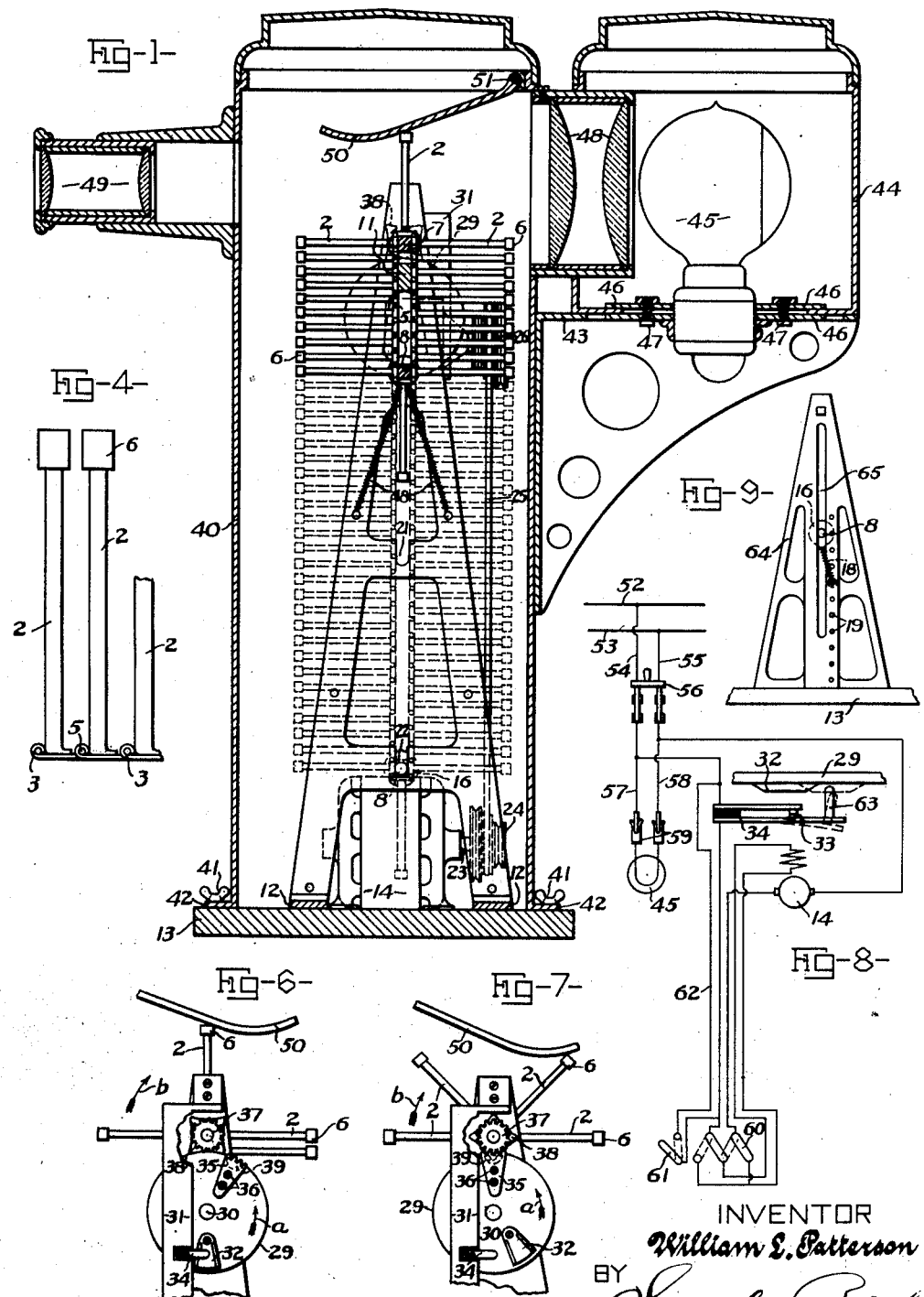

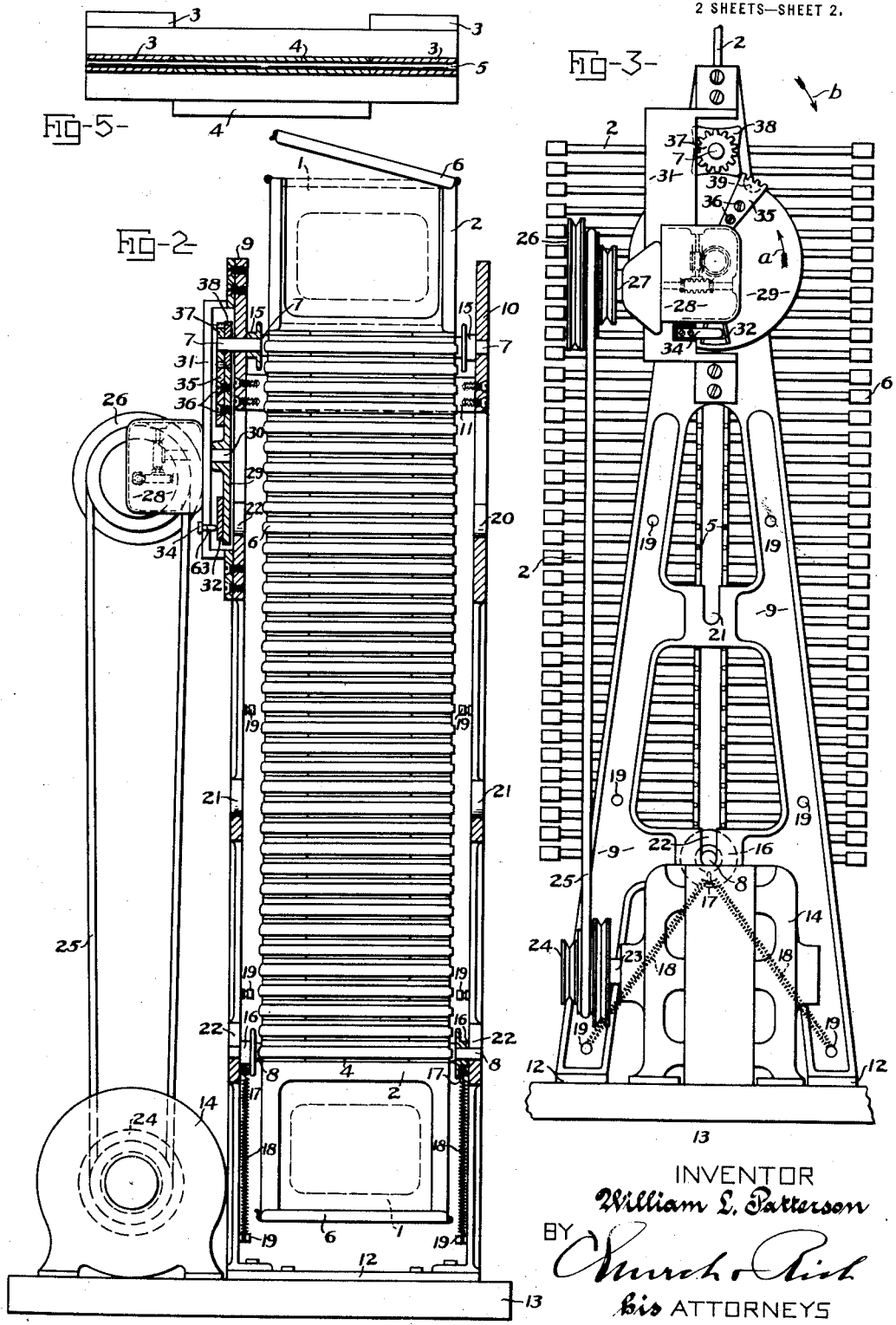

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

AUTOMATIC PROJECTOR.

1,352,471.   Specification of Letters Patent.   Patented Sept. 14, 1920.

Application filed March 22, 1917. Serial No. 156,553.

*To all whom it may concern:*

Be it known that I, WILLIAM L. PATTERSON, a citizen of the United States, residing at Rochester, in the county of Monroe, State of New York, have invented certain new and useful Improvements in Automatic Projectors; and I do declare the following to be a full, clear, and exact description of the same, reference being had to the accompanying drawings, forming part of this specification, and to the characters of reference marked thereon.

This invention relates to optical projection apparatus and has for one object to provide an automatic or semi-automatic projector having illuminating and projection systems arranged in a unit separable from the unit embodying the object carriers and their actuating mechanism in order to render the object carriers and associated mechanism conveniently accessible without disturbing the normal relative arrangement of the illumination and projection systems; another object of the invention is to provide an automatic projector, the slide or object carrier capacity of which may be readily increased or decreased while always yieldingly maintaining tension of the endless chain of slide carriers when adjusted to any length. Another object of the invention is to provide an improved shutter or blind adapted to automatically cut off the light rays projected by the apparatus on the screen while the slides or other objects are being changed, in order to prevent the disagreeable effects of tumbling or shifting images; another object of the invention is to provide an electrical remote control for the object carrier actuating mechanism.

In the drawings:

Figure 1 is a vertical sectional side elevation of the improved automatic slide projector. Fig. 2 is an enlarged front elevation of the slide carrier chain and its motor mechanism, and a vertical section of the slide carrier supporting frame and portions of the carrier actuating gearing. Fig. 3 is a reverse side elevation of the slide carrier frame and carriers, and the motor gearing and electric circuit closing devices. Fig. 4 is an enlarged edge view of a few coupled slide carriers. Fig. 5 is a plan view of two coupled carriers with their pin-engaged hinge eyes in horizontal section. Figs. 6 and 7 are detail side elevations respectively illustrating different relative positions of the slide carriers and their actuating means, the automatic circuit closers, and the lower portion of the coacting light shutter. Fig. 8 is a diagram illustrating electric circuits which may be used in operating the slide carrier motor and the light source. Fig. 9 is a side elevation of a slight modification embodying another method of slotting the slide carrier supporting frame to accommodate varying numbers of carriers in the endless carrier chain.

The picture or object slides 1 are in carriers or holders 2 which are flexibly coupled together in an endless chain by hinges shown formed of eyes 3, 3, on the inner base portion of one slide, an eye 4 on the base portion of the next slide, and a pin 5 entering the alined eyes 3, 4, 3, as more clearly shown in Figs. 4 and 5 of the drawings. The slides normally rest against the inner or hinged edge flanges of the carriers and each carrier preferably has an opposite end-hinged cover portion 6 manually openable to permit quick and easy introduction and removal of the slides. The slide carrier chain may consist of a varying number of carriers as the character of any special lecture or entertainment may require. The drawings show in full lines in Fig. 1, twenty two slide carriers, and show in full and dotted lines in Fig. 1, and in full lines in Figs. 2 and 3, the full complement of seventy-four carriers and also show provision for use of fifty carriers, as hereinafter more fully explained. The slide carrier chain is supported preferably by upper and lower polygonal or square shafts 7, 8, whose plane sides are about as wide as the inner hinged bases of the slide carriers 2. The upper sprocket shaft 7 is permanently journaled by its end bearings in opposite side plates 9, 10 of a supporting frame, these plates being held parallel by upper and lower tie bars 11, 12, screwed or bolted to them. The lower tie bars 12, are bolted to a preferably wooden base 13 to which also the electric motor 14 may be fastened. The upper frame tie bar 11 stands vertically edgewise within the bight of the endless carrier chain and near the chain supporting shaft 7, and as said tie bar is about as thick as the shaft, the bar acts as a lateral brace to steady the carrier chain before and after it is moved by rotation of the shaft 7 by or from the motor.

Flanged collars 15 are placed on the upper shaft 7 between the slide carriers and the frame plates 9, 10, and serve as lateral guides for the carrier chain to center the carrier slides laterally relatively to the optical axis of the instrument. Flanged collars 16 are placed on the lower idler shaft 8 between the slide carriers and the frame plates 9, 10, and act like the upper collars 15 in laterally guiding the coupled carriers. These collars 16 also preferably have a lateral extension, such as an eye 17, into which may be hooked the one end of each two normally contracting spiral springs 18, the other ends of which may be detachably hooked upon grooved studs 19 fixed in level pairs to each of the frame plates 9, 10, to hold the end journals of the shaft 8 into any opposed pair of slots 20, 21, 22, formed in the frame plates 9, 10, above the level of the respective coacting pairs of studs 19. When twenty-two coupled slide carriers are used the ends of the lower shaft 8 are held at the upper opposed frame slots 20 by the springs 18 then coupled to the upper pairs of fixed frame studs 19, as shown in full lines in Fig. 1 of the drawings. When the full complement of seventy-four coupled slide carriers are used the shaft 18 is held at the lowest opposed frame slots 22 by the springs 18 then coupled to the lowest pairs of fixed frame studs 19, as shown in Figs. 2 and 3 of the drawings. When fifty slide carriers are used the springs 18 then coupled to the intermediate frame studs 19, will hold the shaft 8 at the intermediate frame slots 21, as will readily be understood without special illustration. It requires but a few minutes to remove one or more of the slide carrier hinge pins 5, and add or remove any desired number of carriers and contained slides and then recouple the carrier chain and readjust the lower shaft 8 at the necessary frame slots 20 or 21 or 22 under tension of the springs 18. Any desired number of vertically alined slots such as 20, 21, 22, may be formed in the opposite side plates 9, 10, of the frame to receive end journals of the lower slide carrier shaft 8, with spring connecting studs 19 below each slot, thereby permitting the use in this apparatus of a greatly varying number of slide carriers and slides, say from ten or twelve to one hundred or more, as may be most convenient or necessary. The number of slides useful at any given time thus may readily be arranged in the apparatus for projection one or more times upon a suitably arranged screen and with economy of time and motive power. The tension springs 18 stretch to accommodate intermittent partial turns of the polygonal shafts 7, 8, during movements of the slides and also yieldingly maintain a constant desirable tension of the slide carrier chain. Because of the special reverse diagonal arrangement of the two springs 18, 18, at opposite sides of the frame, said springs tend to laterally center the lower carrier chain shaft 8 in the supporting frame and appreciably relieve friction at the sides of the frame slots during intermittent movements of the carriers, and this lateral shaft centering function of the diagonal springs would prevail even should the frame slots be omitted, but the use of said slots is preferred in practice as they positively constrain the chain at all length adjustments of it against excessive unsteadying lateral movement.

The motor shaft 23 fixedly carries a cone pulley 24 from which a belt 25 runs to a speed reducing cone pulley 26 fast on a shaft 27 adapted through any suitable interposed and preferably incased system of gearing 28 to rotate at greatly reduced speed an intermediate wheel 29 which is journaled on a stud 30, fixed to an offset bracket 31 fastened at its ends to the frame plate 9. The wheel 29 carries a face cam 32, adapted at every revolution of the wheel to separate contact points 33 of an ordinary circuit breaker 34, fixed with necessary insulation to the bracket 31. A toothed gear segment 35 is fastened to the wheel 29 by screws 36 with its teeth projecting beyond the wheel periphery and in manner permitting adjustment of the segment teeth to promote their timely engagement with the teeth of a pinion 37 fixed to the carrier chain moving shaft 7, which also fixedly carries an ordinary stop plate 38 having four concave edge portions each of which closely fits the periphery of the intermediate wheel 29. This wheel has a notch 39 adapted to receive any corner of the turning stop plate 38 and permit the moving gear segment 35 to engage the pinion 37 and give a one quarter revolution to the shaft 7 and thus move the entire slide carrier chain sufficiently to carry the last projected slide over downward and move the next slide into projective position.

Fig. 1 of the drawings sufficiently shows that a casing 40 houses and protects the entire slide carrier supports and the slides and preferably also the motor 14, and the mechanism actuating the carrier chain by or from the motor. This casing 40 is detachably fastened to the base preferably by screws having thumb nuts 41 clamping bottom flanges 42 of the casing to the base 13 in manner permitting quick and easy removal of the casing and the lens and light systems supported by it to give full access to the slide carrier chain and its actuating mechanism. At its rear part the casing 40 has fixed brackets 43 supporting a lamp house 44 in which is arranged the light source shown as an incandescent electric lamp 45 whose base is held adjustably by clamp plates 46 and bolts 47 to the bottom wall of the lamp house. In front of the light source is arranged a system of condensing lenses 48 between which and the front adjustable system of projecting lenses 49 the slides 1 in the carriers 2 are intermittently moved singly into position to be projected by the lenses 49. Above the top of the uppermost slide carrier is yieldingly held a light shutter 50, preferably hinged at 51 to the casing 40, so as to normally rest upon the outer free edges of the slide carriers 2, as they are moved either forward or backward.

In the diagram of Fig. 8, the current supplying line wires are indicated at 52, 53, and wires 54, 55 connect with a switch 56 which may or may not be used. Wires 57, 58, pass from the switch 56 to the lamp 45 and plug contacts 59 may be interposed in the wires 57, 58, to facilitate breaking and making conductive connections when the combined casing and lens and light structure is temporarily removed from the base 13 to give full access to the slide carrier chain and its motor mechanism. A pole changer 60 has wire connections to the field of the motor 14 to reverse the motor, and the pole changer also is wired to the circuit breaker 34. A switch 61 assures remote control by the lecturer of a shunt circuit over a wire 62.

The apparatus is set up for use with the parts relatively arranged as shown in Fig. 1 of the drawings, proper electric connections being made between the line wires and the motor 14, the lamp 45, the pole changer 60, and the shunt control switch 61 and shunt wire 62. The parts 60, 61, are in convenient reach of the lecturer near the screen and usually distant from the projector. Should the maximum number of seventy-four slides be used in the projector shown as an example of this invention, the slides 1 will be arranged in their carriers 2 in the order of projection beginning with the top vertical slide and following each other downward at the right hand and then upward at the left hand. When only twenty-two slides are to be used, the slides will all be arranged at the right hand of the top vertical slide first to be projected.

Assuming that the intermediate wheel 29 has stopped in the position shown in Figs. 3 and 6, and that the shunt control switch is closed as indicated in dotted lines, and that the pole changer 60 is adjusted as in full lines, the motor 14 will start and will turn the wheel 29 in direction of arrow a, thereby carrying the wheel cam 32 from under a stud 63 on the longer elastic member of the circuit breaker 34 and permitting its two points 33 to contact and close a circuit through the motor 14 and the pole changer 60. One corner of the turning stop plate 38 now enters the wheel notch 39, and the segment 35 engages the pinion 37 and gives a one-quarter turn to the shaft 7, thereby carrying the first projected slide over in direction of arrow b, and bringing the second slide into vertical position where it remains for projection on the screen for a predetermined time interval of about fifteen seconds more or less, accordingly as the belt 25 may be adjusted on the pulleys 24, 26, to regulate the speed of rotation of the wheel 29. As the wheel 29 approaches its full revolution in direction of arrow a, its cam 32 again opens the circuit breaker 34 thereby breaking the circuit through the pole changer 60, but as the shunt circuit through the wire 62 and the closed switch 61 still is active the motor 14 continues running in the same direction and thus carries the wheel 29 around until its segment 35 again engages the pinion 37 and gives the next quarter turn to the shaft 7 and moves the slide carrier chain to automatically bring the third slide into position for projection on the screen. As long as the switch 61 remains closed, the motor 14 will continue to run and the slides will be projected automatically on the screen with a desirable time interval of about fifteen seconds between exposure of successive slides. During exposure of the slides the shaft 7 is locked to hold the slides steady by contact of the stop plate 38 with the periphery of the intermediate wheel 29. The shutter 50 rises and falls with the outer parts 6 of the moving slide carriers to prevent passage of light freely through the optical system during the time intervals between exposure of successive slides or objects.

Should a specially long exposure of any particular slide or object be desired by the lecturer or operator he simply moves the switch 61, to the position shown in full lines, thereby breaking the shunt circuit over the wire 62, just before said slide is brought to projective position, and when the cam 32 on the moving wheel 29 next opens the circuit breaker 34, the remaining circuit through the pole changer 60 is broken and the motor 14 now stops thereby stopping the wheel 29 approximately in the position shown in Figs. 3 and 6, with the segment gear 35 close to the slide carrier shaft pinion 37, in readiness for almost instant engagement of this pinion by the gear after the lecturer desires to project the next slide upon the screen and therefore again closes the shunt circuit switch 61 to start the motor. Should the lecturer desire to again refer to any particular slide or slides recently projected on the screen he will move the pole changer 60 to the dotted line position thereby reversing current flow through the motor field which reverses the motor 14, thus assuring backward movement of the carrier chain to bring the desired slide to projective position where it may be held any desired time by opening the shunt line switch 61. To resume normal movement of the slide chain in direction of arrow b, the switch 61 is again closed and the pole changer 60 is returned to its full line position. Should the switch 56 be used it may be quickly opened to simultaneously cut out of circuit the projector lamp and the slide carrier motor devices as emergency may require. It is obvious that the pole changer 60 is used only when reversal of direction of operation of the slide carrier chain is desired, hence the pole changer may at times be dispensed with in which case the motor 14 will run in one direction while it is wired to the circuit breaker 34, the line wires 52, the shunt wire 62 and the shunt control switch 61, as will readily be understood without special diagrammatic illustration.

This improved slide projector embodies in what is believed to be a novel manner, two separable composite units, one unit comprising the slide supporting frame 9, 10, 11, 12, and coupled carriers 2 containing the slides 1, the motor 14, and the associated gearing operating the slide chain, and the other composite unit comprising the casing 40 inclosing the first named unit and carrying in optical alinement the condensing lens system 48, the projecting lens system 49, the light source 45, and the light shutter 50. This separable unit construction assures constant optical alinement of the condensing and projecting lens systems and the light source in the unit including the casing 40, which may easily and quickly be removed from the base 13 after removing the fastening nuts 41, and when the casing structure is thus removed the other unit including the slide carrier chain, the motor and the associated gearing for operating the carriers is fully accessible for conveniently making necessary tests or adjustments thereof without interference by the lens and light systems of the apparatus. It is not essential that the casing 40 have solid walls below the dark chamber and the condensing and projecting lens systems as shown in the drawings, but the illustrated solid wall construction is now preferred because of the protection it gives the interior parts from dust and dirt and from meddling by those not authorized to use the apparatus.

In the simple modification of the slide carrier supporting frame sufficiently shown on a much reduced scale in Fig. 9 of the drawings, the opposite frame side plates 64 are each provided with one long central vertical slot 65, the opposite side walls of which provide bearings which laterally constrain the lower slide carrier chain idler shaft 8 which is vertically adjustable to any elevation in the frame slots 65, as any desired length of the carrier chain may require. A series of quite loosely spaced studs 19 are set in the frame plates 64, along one side of the slots 65 to any one of which studs may be coupled the lower end of the spring 18 which is connected at its upper end to the adjacent shaft collar 16. This modified frame construction allows the number of slide carriers to be more closely varied by permitting the carriers to be added to or taken from the carrier chain not only in groups or multiples, but also permitting the addition of one carrier at a time.

Having thus described my invention what I claim and desire to secure by Letters Patent of the United States, is:

1. A projection apparatus embodying one composite unit comprising a supporting frame, a chain of object carriers movable on the frame, and mechanism on the frame for advancing the carriers one at a time into position for projection, and a second composite unit adapted to be associated with and dissociated from the first unit, said second unit comprising an illuminating system and a projection system adapted respectively when the two units are operatively associated to illuminate the object carrier that is in position to be projected and to project an image of the object.

2. In an automatic projector, the combination of a frame, a shaft journaled therein, a slide carrier chain driven by said shaft, a driven member on said frame, an intermittent driving and stop mechanism connecting said shaft and driven member, a motor for driving the latter, an automatic switch for breaking the circuit of said motor during operation of said mechanism, a shunt circuit bridging said switch, and a second switch for making and breaking said shunt circuit.

3. In an automatic projector, the combination with a frame having a rotatable sprocket member journaled therein and an extensible chain comprising a plurality of object carriers detachably held together, suspended from and movable with the said sprocket member, of an idler in the lower bight of the carrier chain and journaled to be progressively adjustable in the direction of length of the chain, for different chain lengths, and two pairs of springs, one pair at each side of the frame, connected at one end to the adjacent end of the idler and thence ranging downward and outward diagonally in oppoite directions and coupled at their lower ends to the frame, thereby yieldingly maintaining tension of the slide carrier chain in the direction of its length and laterally centering and steadying it.

4. In an automatic projector, the combination with an illuminating system, a projection lens system and a series of slide carriers coupled in a chain and adapted to be individually tilted into and out of coöperative relation with the illuminating and projection lens systems in the path of light therebetween, of a shutter coacting directly with the successive moving slide carriers and adapted to pass into and out of the path of light between the illuminating system and the projection lens system to cut off the light passing directly from the illuminating system to the projection lens system while the slide is in a tilted position.

5. In a projection apparatus embodying an illuminator and a projection lens system, the combination with a series of slide carriers each movable successively about a stationary axis into and out of position in the light path between the illuminator and projection lens system to be projected by the latter, of a shutter having an end movable into and out of the path of light between the illuminator and projection lens system and adapted to rest successively against the outer edge of each of the carriers.

6. In a projection apparatus embodying an illuminator and a projection lens system, the combination with a series of slide carriers each movable successively about a stationary axis into and out of position in the light path between the illuminator and projection lens system to be projected by the latter, of a shutter having an end successively resting against and movable with the outer edge of each of the carriers while said outer edge of the carrier is moving across the portion of said light path temporarily unobstructed by the area of the carrier.

7. In an automatic projector, the combination with a slide carrier chain, a sprocket member adapted to actuate said chain, a gearing for alternately advancing and locking the sprocket member and chain, and an electric motor for operating the gearing, of a normally closed circuit breaker actuated to break the motor circuit when the gearing has turned into position of readiness to promptly advance the sprocket member and carrier chain, and a manually controlled shunt for short circuiting the circuit breaker.

8. In an automatic projector, the combination with a frame, a slide carrier chain, a sprocket shaft journaled in the frame and supporting and actuating said chain, a stop plate and pinion rotatable with the shaft, an intermediate stop wheel journaled on the frame and having a notched periphery coacting with the sprocket shaft stop plate and also having a gear segment coacting with the shaft pinion, a cam on the stop wheel, and a circuit breaker adapted to be opened by said cam, of an electric motor, a shunt circuit around the circuit breaker, and a switch adapted to make and break said shunt circuit.

WILLIAM L. PATTERSON.